United States Patent
Wang et al.

(10) Patent No.: US 10,416,614 B2
(45) Date of Patent: Sep. 17, 2019

(54) HUMAN PROGRAMMING INTERFACES FOR MACHINE-HUMAN INTERFACES

(71) Applicant: Siemens Aktiengesellschaft, Munich (DE)

(72) Inventors: Lingyun Wang, Princeton, NJ (US); Arquimedes Martinez Canedo, Plainsboro, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 4 days.

(21) Appl. No.: 15/284,571

(22) Filed: Oct. 4, 2016

(65) Prior Publication Data

US 2017/0108834 A1  Apr. 20, 2017

Related U.S. Application Data

(60) Provisional application No. 62/241,919, filed on Oct. 15, 2015, provisional application No. 62/247,214, filed on Oct. 28, 2015.

(51) Int. Cl.
*G05B 11/01* (2006.01)
*G06Q 10/06* (2012.01)
*G06F 3/0484* (2013.01)

(52) U.S. Cl.
CPC ............. *G05B 11/01* (2013.01); *G06Q 10/06* (2013.01); *G06F 3/0484* (2013.01)

(58) Field of Classification Search
CPC ....... G05B 11/01; G06F 9/542; G06F 3/0484; G06Q 10/00
USPC .......................................................... 700/83
See application file for complete search history.

(56) References Cited

U.S. PATENT DOCUMENTS

| | | | |
|---|---|---|---|
| 5,140,537 A * | 8/1992 | Tullis | G05B 19/41885 703/6 |
| 9,452,885 B1 * | 9/2016 | Lal | G06Q 10/08 |
| 2005/0232491 A1 | 10/2005 | Chang et al. | |
| 2009/0030543 A1 * | 1/2009 | Menser, Jr. | G05B 19/4184 700/121 |
| 2012/0056800 A1 | 3/2012 | Williams et al. | |
| 2015/0351681 A1 * | 12/2015 | Lee | A61B 5/4806 600/595 |
| 2015/0352719 A1 * | 12/2015 | Nakazato | B25J 9/1674 700/253 |

(Continued)

OTHER PUBLICATIONS

Sprdik, Otakar et al.: "Detection and Estimation of Human Movement Using Internal Sensors: Applications in Neurology"; in Czech Technical University in Prague; (Year: 2012).

*Primary Examiner* — Kenneth M Lo
*Assistant Examiner* — Michael W Choi (57) ABSTRACT

A system for interacting with humans in an automation environment includes an automation system machine, one or more processors and a non-transitory, computer-readable storage medium in operable communication with the processors. The computer-readable storage medium comprises one or more programming instructions that, when executed, cause the processors to select a human from a plurality of humans working in the automation environment; retrieve information related to the human using a human programming interface (HPI); and perform one or more actions with the automation system machine based on the information related to the human.

20 Claims, 8 Drawing Sheets

(56) References Cited

U.S. PATENT DOCUMENTS

| | | |
|---|---|---|
| 2016/0224012 A1 | 8/2016 | Hunt |
| 2017/0032281 A1* | 2/2017 | Hsu ..................... B23K 9/0953 |
| 2017/0038762 A1* | 2/2017 | Canedo ................ G05B 19/406 |
| 2017/0091791 A1* | 3/2017 | Srinivasan ......... G06Q 30/0202 |

\* cited by examiner

HUMAN PROGRAMMING INTERFACES FOR MACHINE-HUMAN INTERFACES

CROSS-REFERENCE TO RELATED APPLICATIONS

This application claims the benefit of U.S. Provisional Application Ser. Nos. 62/241,919 filed Oct. 15, 2015, and 62/247,214 filed, Oct. 28, 2015 both of which are incorporated herein by reference in their entirety.

TECHNICAL FIELD

The present invention relates generally to human programming interfaces to be applied with machine human interfaces, along with methods, systems, and apparatuses related thereto. The disclosed technology may be applied to, for example, the generation and use of human digital twins in various automation system contexts.

BACKGROUND

Manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control or unit layer. An intermediate layer integrates and connects business and control layers. This intermediate layer includes a manufacturing execution system (MES) that defines an MES process in terms of data and interactions between functions, such as resource management, resource allocation, dispatching, data collection and acquisition, quality assurance management, maintenance management, performance analysis, scheduling, document control, labor management and material and production tracking.

The interaction between humans and machines during the manufacturing process is done through interfaces referred to as Human Machine Interfaces (HMIs). The HMI is the single entry point to the machine world for machine operators; it provides humans the status information about the machines such as position, velocity, temperature, etc. Using this information, the human provides commands to the machines to modify their behavior; for example, for them to stop, to move, to mill, to drill, etc.

HMI technology is human-centric, built for humans to understand machines. Thus, HMI typically focuses on techniques receiving information from machines and presenting in a manner that allows a human to quickly review and respond accordingly. However, aside from this presentation, the automation system largely ignores the important roles of humans in the automation environment. This exposes a deficiency in the system because the safety, quality and efficiency overall automation system is highly dependent on how humans interact it.

A major problem in machine-human communication is that there is no interface that machines can used to access humans. Machines communicate with one another via application programming interfaces (APIs). Each API provides a list of set of methods, protocols, and tools for a interacting with a machine. For example, an API for a conveyor belt may allow a machine to provide commands for starting and stopping the belt, querying for status information, etc. However, to date, there are no APIs offered for interacting with humans in the automation environment. Thus, machines must rely on direct input of information (e.g., via the MES, a HMI) to get information about the humans working with the machines. This introduces inefficiency in the automation system because information input is primarily a manual process. Moreover, it limits the flexibility of the overall automation environment because machines lack the knowledge of how to best interact with humans.

In the future smart factory where machines are intelligent and autonomous, there will also be humans cooperating with machines to achieve unprecedented levels of efficiency and creativity. Humans will play a more important role than today because they will be the critical decision makers. Humans will be participating and collaborating with machines at a higher level than what it is today—e.g., supervising machines; making decisions that machines cannot make; interchanging tasks with machines; optimizing production by involving the analytics contributed by machines, etc. However, such collaboration between humans and machines will be hindered if a machine-to-human interface and concept are not clearly defined and humans are not modeled digitally. Thus, beyond just communication, there is also a need for digitally modelling the human as another machine which performs work in the factory.

Accordingly, it is desired to provide a Human Programming Interface (HPI) that machines can use to access the available data generated by humans to integrate humans into the automation environment in a manner that enhances machine-to-human communications beyond the capabilities currently available in automation technology. It is further desired to build upon such an interface to provide complete digital modeling of the human for use in optimizing factory activities.

SUMMARY

Embodiments of the present invention address and overcome one or more of the above shortcomings and drawbacks, by providing methods, systems, and apparatuses related to a human programming interfaces (HPIs) for Machine Human Interfaces (MHIs) which may be applied in industrial applications. The HPI described herein allows machines to better interact and understand human behavior and our world. These HPIs are used as the basis of a digital twin which models humans in the automation context.

According to some embodiments, a system for interacting with humans in an automation environment includes an automation system machine, one or more processors and a non-transitory, computer-readable storage medium in operable communication with the processors. The computer-readable storage medium comprises one or more programming instructions that, when executed, cause the processors to select a human from a plurality of humans working in the automation environment; retrieve information related to the human using a HPI; and perform one or more actions with the automation system machine based on the information related to the human. In some embodiments, the HPI is part of a digital twin associated with the human and the instructions cause the processors to perform at least a portion of the one or more actions using the digital twin.

In some embodiments of the aforementioned system, the instructions further cause the processors to provide a message describing the one or more actions to the human via the HPI. This message may be provided to the human, for example, by using the HPI to identify a communication device associated with the human and then sending the message to the communication device using the HPI. This communication device may be, for example, a smartphone and the message may be sent to the human as a text message or email. In some embodiments, the HPI is used to insert an event with the message into a calendar correspond to the human.

In some embodiments, the aforementioned system selects the human from the plurality of humans working in the automation environment by first using the HPI to retrieve calendar information corresponding to each of the plurality of humans. Then, the calendar information is used to select the human based on the human's availability over a time period during which the one or more actions will be performed. Additionally, the HPI can be used to retrieve health-related information corresponding to each of the humans and/or skillset information corresponding to the humans. This additional information may then be used for selecting the human.

In some embodiments of the aforementioned system, the actions may require interaction by the human with the automation system machine. If this is the case, the processors may use the HPI to monitor the human's interaction with the automation system machine while performing the actions. For example, during the interaction by the human with the automation system machine, the HPI may be used to retrieve biological information associated with the human. If it is determined that the human is incapable of performing the actions based on the biological information, a notification may be provided to the human to stop performing the one or more actions.

According to another aspect of the present invention, a second system for interacting with humans in an automation environment includes one or more processors and a non-transitory, computer-readable storage medium in operable communication with the processors. The computer-readable storage medium comprises one or more programming instructions that, when executed, cause the processors to detect one or more workers present in the automation environment and, for each of the one or more workers, instantiate a digital twin for the worker using the following process. First, the digital twin is generated for the worker and current data associated with the worker is retrieved. The current data associated with the worker is used to update the digital twin. Additionally (or alternatively), in some embodiments, the digital twin may be updated based on information manually input by the corresponding worker. Once the digital twin is instantiated and updated, external entities may access the digital twin via the HPI.

Various enhancement, refinements, or other modifications may be applied to the aforementioned second system. For example, in some embodiments, the instructions further cause the processors to receive a request for execution of a human action from a machine in the automation environment (e.g., via a HPI associated with the digital twin). The digital twin associated one of the workers is then used to perform the human action. In some embodiments, the digital twin associated with at least one of the workers to perform testing of at least one product. This product may be real product itself or a digital twin of the real product.

According to other embodiments of the present invention, a method for using a HPI to interact with humans in an automation environment includes providing, by a machine-human interface computer, a programming interface for accessing sensor data and service data corresponding to a plurality of humans working the automation environment. The machine-human interface computer receives a function call from a machine via the programming interface for information associated with a human. This function call comprises a request for retrieval human information. The machine-human interface computer next automatically generates a response to the function call comprising the human information. In some instances, the machine-human interface computer may automatically retrieve the requested human information from a sensor associated with the human. In other instances, the human information may be retrieved from a local database or a database that is external to the machine-human interface computer. Once the response is generated, the machine-human interface computer may be used to transmit it to the machine.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses associated with a machine-human interface (MHI) which allows machines to better interact and understand human behavior and our world. More specifically, the techniques described herein provide "Human Programming Interfaces," or HPIs, that are analogous to APIs in machines, but define a common interface for machines to communicate with humans. As Human APIs are defined, the machine can now truly understand humans and be able to interact with humans more efficiently. HPIs may be defined once and can be used by all machines. With the MHI concept and HPI defined, humans can then be modeled digitally, while providing all the necessary interfaces through the HPI, such that a human digital twin can actually interact with real machines and the production process.

Figure 1:
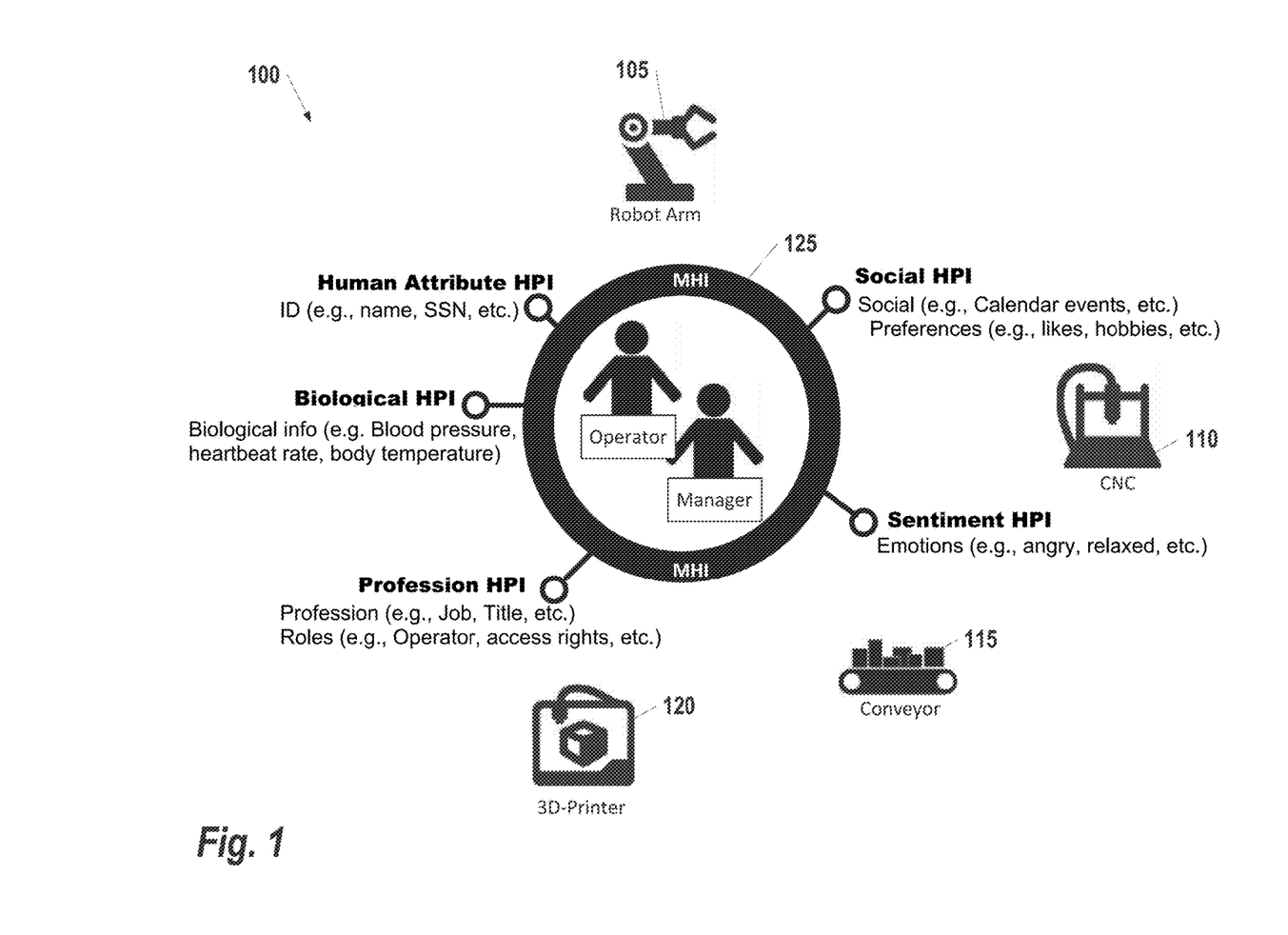
FIG. 1 provides a conceptual overview of a human programming interface, according to some embodiments.

FIG. 1 provides a conceptual overview 100 of a human programming interface, according to some embodiments. A uniform MHI 125 is defined for humans. The MHI stores one or more HPIs. Briefly, the HPIs specify the behaviors and properties of human workers in the automation environment. Machines can uses these HPIs to interact with humans and their environment such as wearable sensors and social events. In this way, machines can collaborate with human in automation processes. The HPI provides single entry point for humans and their attributes, as well as for sending actuating elements for them to engage in actions wanted and generated by machines.

The MHI 125 may be implemented using various techniques, including those described in U.S. patent application Ser. No. 15/237,777, filed Aug. 16, 2016 and entitled "Machine Human Interface," the entirety of which is incorporated herein by reference. Briefly, the MHI 125 is a computer that may function as an independent computing unit or as part of a machine (e.g., the Robot Arm 105, Computer Numerical Control (CNC) 110, Conveyor 115, and/or 3D Printer 120 in FIG. 1). In general the computer can reside anywhere in the factory or, in some embodiments, the computer may reside in a cloud-based environment connected to the factory over a computing network such as the Internet.

Human Sensors (not shown in FIG. 1) are used by the MHI 125 to capture the status of individuals and characterize them as humans, not as other "machines." In the example of FIG. 1 two humans are shown (an Operator and a Manager); however, it should be understood that the concepts presented in this example may be scaled to any number of humans that may interact with the automation system environment. Various sensors collect information about the human subjects. These sensors may generally be any data source generally known in the art. For example, in some embodiments, the sensor may comprise environmental sensors such as microphone arrays installed in the rooms that monitor activity and improve localization, wearables such as bracelets that record heart activity, accelerometers in mobile devices to track motion, machine learning sensors in communication systems (e.g., email, text messages, social networks) to identify behavioral patterns, and lidar sensors to map spaces. These sensors create a status for every human in the automation environment that is stored in the MHI 125, and also the environment they coexist with the machines 105, 110, 115, 120.

The HPI itself comprises tools for interacting with one or more humans by retrieving and setting human data. The HPI tools can take many forms, offering various levels of interaction with a human and her data. For example, in some embodiments, the HPI provides specific routines, data structures, object classes, and variables for directly interacting with human-centric data sources. In other embodiments, the HPI may provide a service-based interface using representational state transfer (REST) or a similar architectural style. In the example of FIG. 1, there are five HPIs: a Human Attribute HPI, a Social HPI, a Sentiment HPI, a Profession HPI, a Biological HPI, and a Human Attribute HPI.

In FIG. 1, the Human Attribute HPI retrieves and sets information of general human attributes such as identity, gender, height, weight, spoken languages, current location, etc. The Profession HPI retrieves and sets information about the employee ID, job, roles, and access levels of a human within the company or organization. The Social HPI retrieves and sets information about the social behavior of a human such as calendar events, emails. The Sentiment HPI: retrieves and sets information of the feelings of a human such as state of mind (e.g., happy, sad), preferences (e.g., Joe likes his work desk to be at a certain height, or he prefers the room at a certain temperature). Lastly, in the example of FIG. 1, the Biological HPI retrieves and sets information of the biological functions of the human such as blood rate and pressure, body core temperature, etc. It should be noted that these HPIs are merely exemplary and any number of addition or alternate HPIs may be used in different embodiments of the present invention.

These HPIs may each be available to machines as independent HPIs. Thus, for example, continuing with the example of FIG. 1, the Social HPI may be a separate interface from the Sentiment HPI. Alternatively, a plurality of HPIs may be collected into one or more aggregate HPI. For example, in some embodiments, a unified HPI interface is defined for all humans.

As seen in FIG. 1 the HPIs provide a unified entry and exit point of information for machines to better interact and understand humans. The world is currently transforming. Billions of "smart" devices will be deployed in our environment; Intel estimates that by 2020 there will be about 200 billion devices making about 26 smart objects for every human being on earth. Therefore, retrieving and setting information for HPIs will become a reality. For example, the Sentiment HPI may be used to gather data from an employee's emails, phone calls, environmental microphones and cameras installed in the factory or the office space that record and analyze its body posture, behavior, and gestures associated with their state of mind. The Biological HPI can gather data from an employee's smart uniform, thermal cameras, and biological sensors in restrooms that analyze their nutrition levels, etc.

Setting information to the HPIs may, in some instances, require actuation devices that trigger action in humans. Simple actuation elements include audible and visual alarms. More advanced actuation elements include emails, text messages, phone calls initiated by machines, and consumed by humans. More advanced actuation elements such as haptic devices, virtual reality, and brain interfaces may alternatively (or additionally) be utilized.

As the HPIs are defined, programs can be coded or automatically generated by autonomous machines to interact with humans via such HPIs. Machines can then use information gathered from HPIs to predict how human behave, and respond proactively based on the information retrieved from human. For example, instead of waiting for an operator to press the emergency button on the screen (as in the traditional HMI approach), a machine with access to HPIs can now detect that an operator is near so a blinking red light-emitting diode (LED) can be shown on the screen to alarm the operator; and if the operator is not near, a text message can be sent to the operator via her mobile device. In both cases, an appropriate safe action should be executed for safety of the plant and production. This machine-centric system allows machines to make intelligent decisions and, if necessary, the machine can send or retrieve information to humans. With HPIs, multi-modal and flexible interfaces can thus be created between machines and humans.

Figure 2:
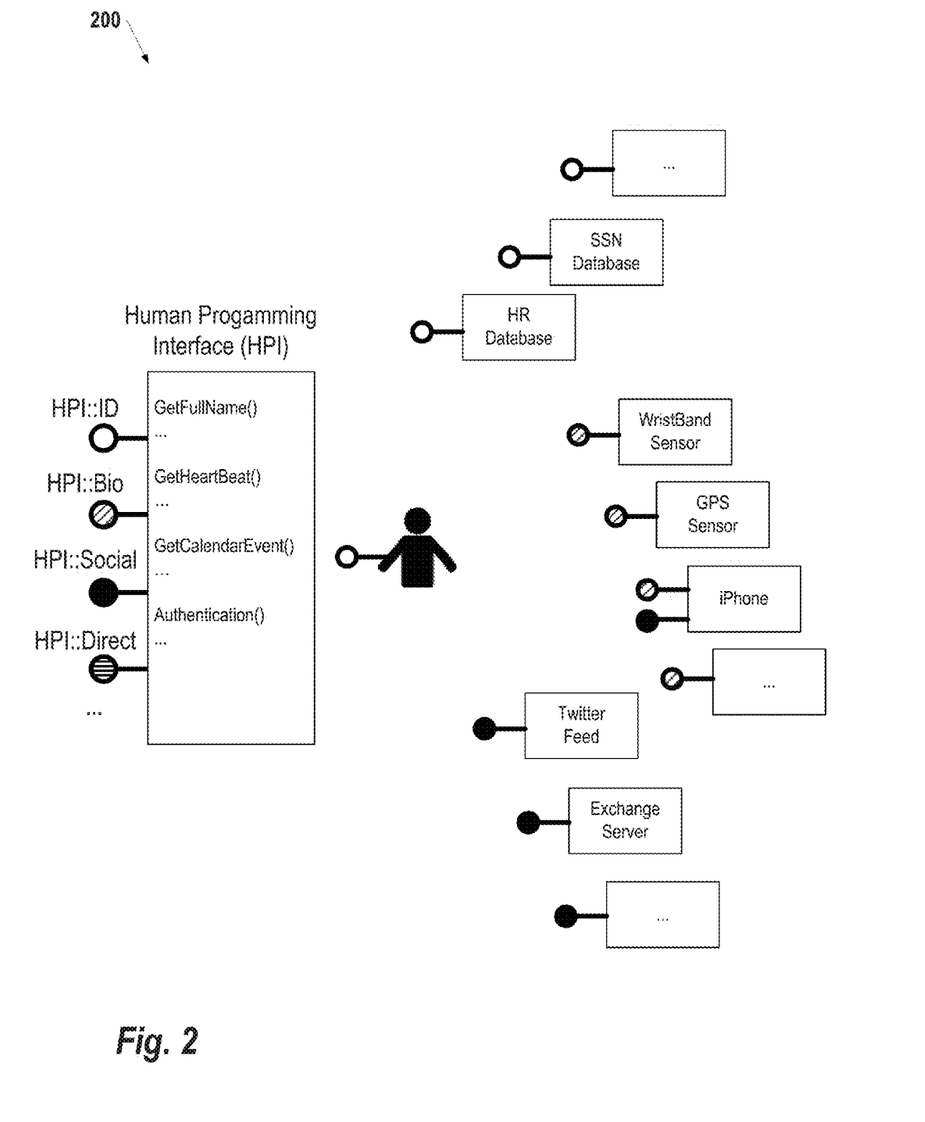
FIG. 2 provides an example of a HPI where a unified HPI is defined for all humans, according to some embodiments.

FIG. 2 provides an example of a HPI where a unified HPI is defined for all humans, according to some embodiments. The implementation of each interface can be provided by different sources such as sensors, existing databases, etc. This is analogous to software API and its implementation. The software API can be provided by different libraries from different vendors. The example of FIG. 2 shows how humans, their sensors (e.g. wristband) and devices (e.g. iPhone) and the existing services (e.g. HR database) can collaboratively contribute to the implementation of the HPI interfaces.

In the above example, different shadings of the interface symbol represent a category of HPI. Thus, the Identification and the Biological categories are represented by an empty interface symbol and an interface symbol with a diagonal line, respectively. The Social category is represented by a filled interface symbol, while the Direct category is represented by an interface symbol with a horizontal line.

Each category in the HPI is associated with certain functions. For example, the Identification category includes a GetFullName( ) function that provides a human's full name. This information may be retrieved, for example, from an existing HR database or service. Similarly, the GetCalendarEvent( ) can be supported by a human's Exchange server or a similar service. Direct information such as live authentication may be provided by human self. Other functions in HPI can be implemented directly using sensors on the human. For example, the GetHeartBeat( ) function can be implemented by a human's wristband sensor.

When a machine program calls a function supported in HPI, the human, or one of his/her devices or existing services will provide information and fulfill the function. Existing devices and services can simply add support to the HPI interfaces in order to communicate and be understood by intelligent machines that uses HPI and MHI.

It is possible multiple devices can fulfill the same interface. In such cases, a resolve function or a priority must be provided in HPI. For example, both iPhone and external Global Positioning System (GPS) can provide location information of a human. A resolve function defined in HPI may be implemented to identify which one provides the most accurate information and, thus, should be used for generating a function response.

Figure 3:
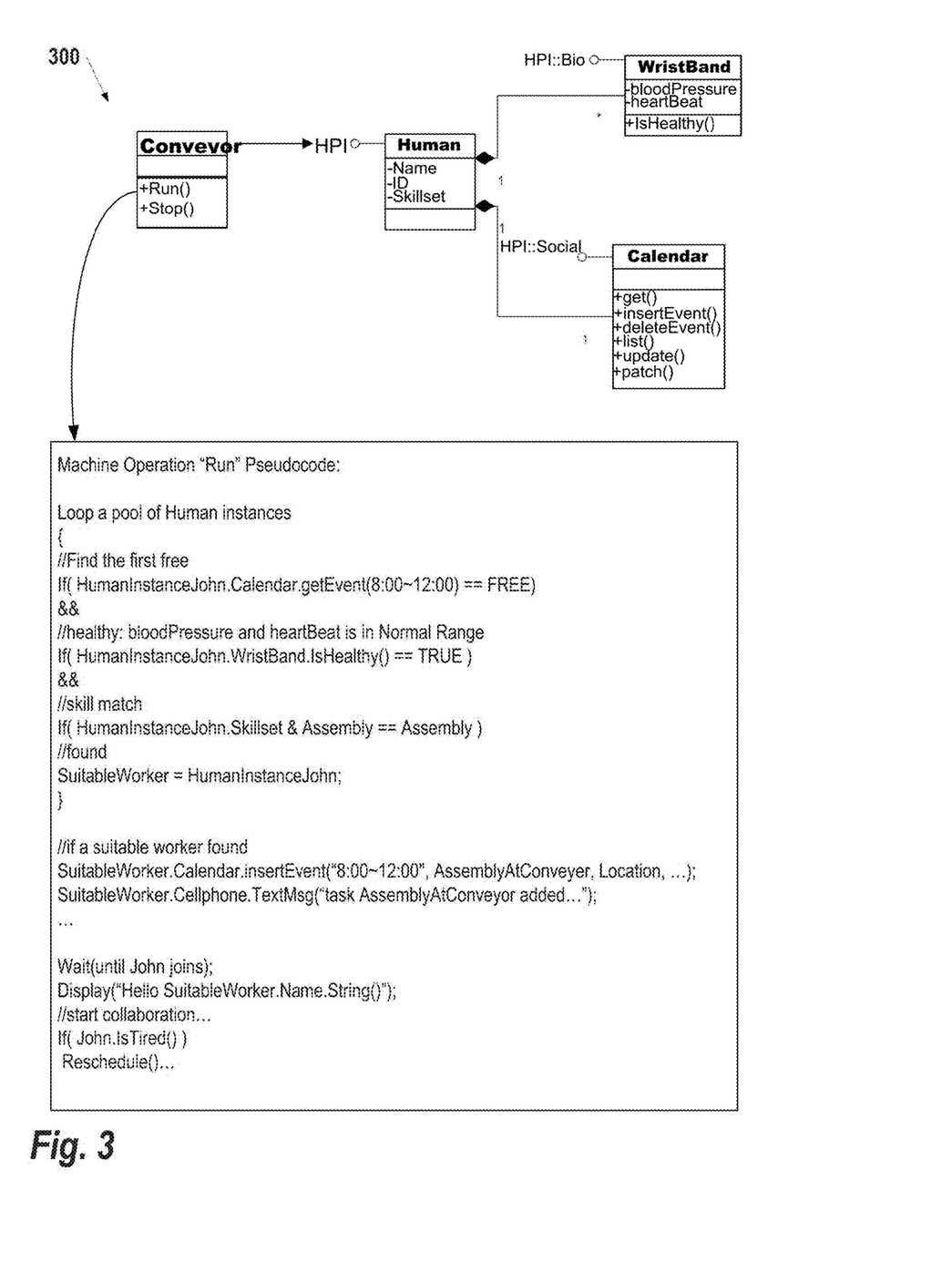
FIG. 3 provides a class diagram that shows how an HPI can be exposed, and the relations of a human and his environment (wristband sensor and calendar)

FIG. 3 provides a class diagram 300 that shows how an HPI can be exposed, and the relations of a human and his environment (wristband sensor and calendar). A human class has properties (e.g. Name, ID, Skillset, etc.) and exposes functions through APIs (e.g. Social API, etc.). A human can have wear sensors (e.g. a wristband). A human can record his events in his calendar.

With the interface well-defined, as shown in FIG. 3, a machine (e.g. a Conveyor) can autonomously and proactively interact with humans. The pseudocode "Run" operation in the class diagram 300 illustrates how an intelligent conveyor system finds a suitable operator via the HPIs fetching calendar and healthy information, and triggers an information action to the operator to collaborate in this operation. In this example, the conveyor first identifies the candidates that are free between 8:00 and 12:00, who are healthy with a blood pressure and heart beats within normal range, and whose skills include assembly. If a suitable worker is found, the conveyor belt inserts a calendar event in the worker's calendar, and sends a text message to warn the operator about his new task. It then waits until the worker is in the room, greets him, and begins the collaboration. Whenever the conveyor belt detects that the operator is tired, it may trigger a rescheduling operation and fetch another worker.

With the concepts MHI concepts and HPI defined, humans can be modeled digitally, while providing all the necessary interfaces through HPI, such that a human digital twin can actually interact with real machines and the production process. A digital factory (smart factory, factory of the future, etc.) is incomplete without modeling humans. Human digital twins will bring the real benefits of the future smart digital factory, where humans and machines can collaborate virtually as well as in real world. The existence of Human Digital Twins, and Machine Digital Twins, blurs the distinction between human and machine worlds, and between real and virtual worlds. These models can seamlessly interact in reality as well as digitally to better collaborate and improve the industrial processes, safety, efficiency, creativity, etc.

Figure 4:
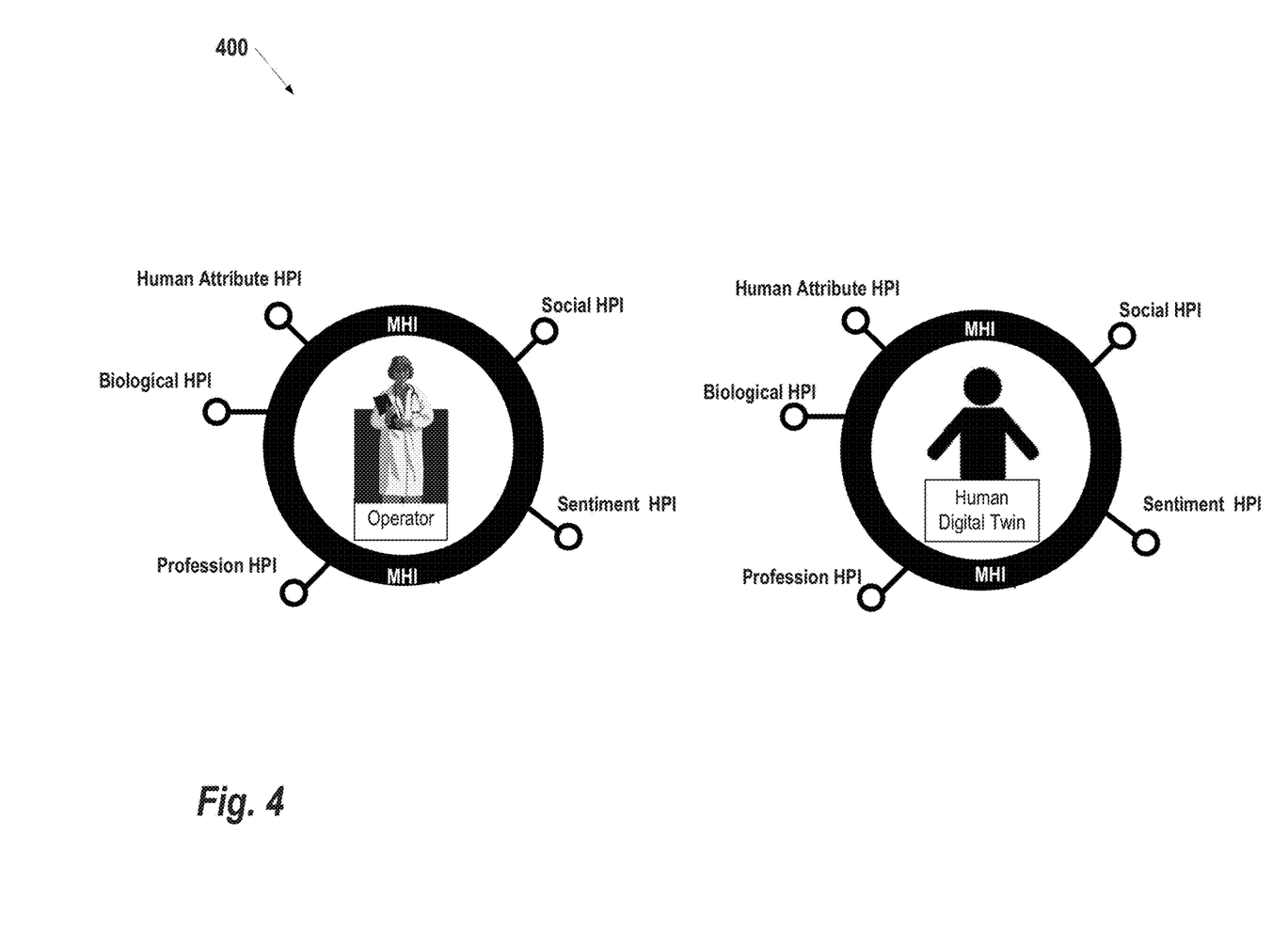
FIG. 4 shows how a worker can be represented by a digital twin, according to some embodiments.

FIG. 4 shows how a worker can be represented by a digital twin, according to some embodiments. More specifically, the left side of FIG. 4 shows the MHI and HPI interfaces for a real factory operator. The right side of FIG. 4 shows a digital twin of the real worker that can provide the identical MHI and HPI interfaces.

Figure 5:
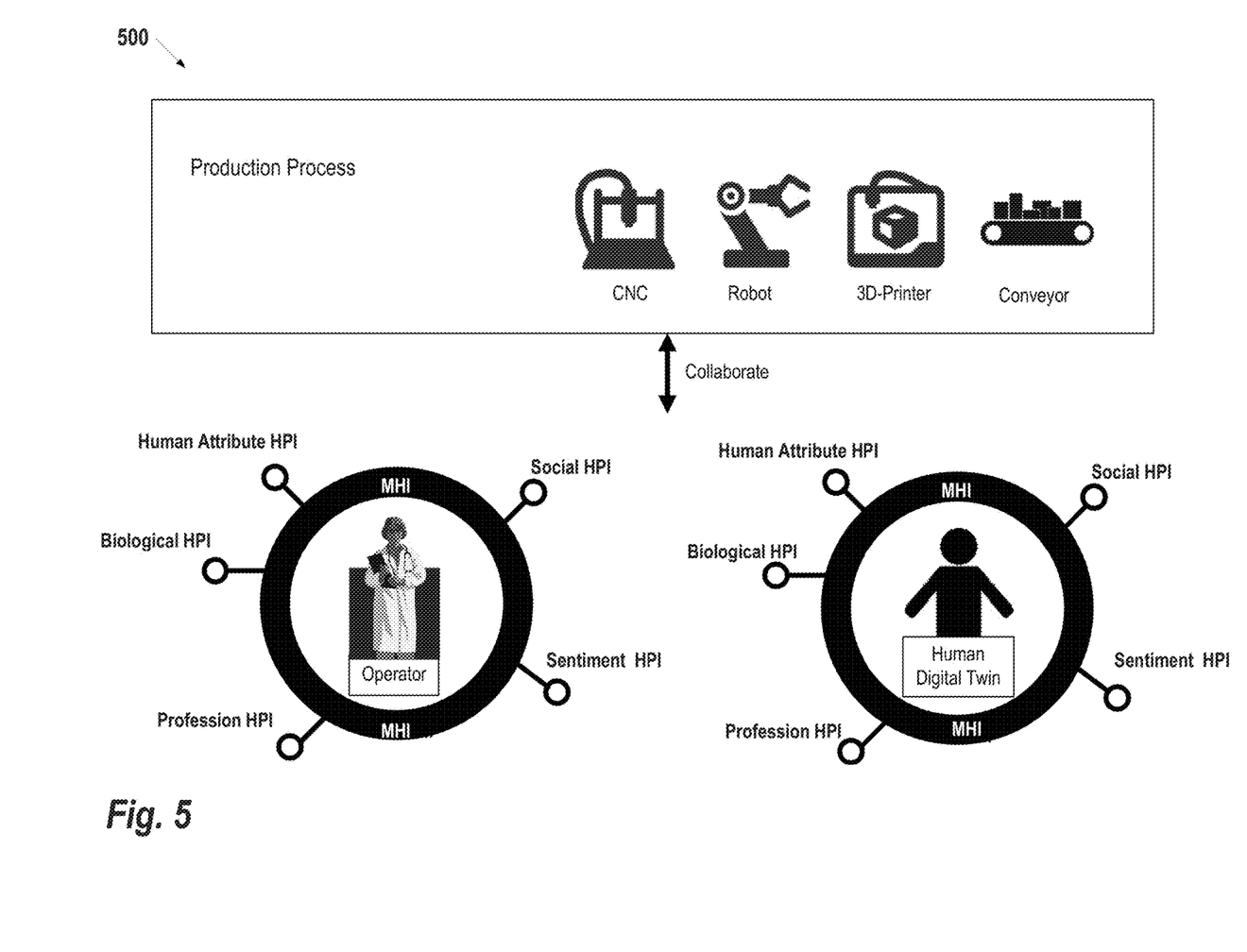
FIG. 5 depicts the interactions between machines in a production process and human, according to some embodiments.

FIG. 5 depicts the interactions between machines in a production process and human, according to some embodiments. The machines can now autonomously interact with MHI and HPI interfaces to collaborate with humans. From a machine's point of view, there is only one interface to interact with the human instance, regardless of whether its instance is virtual (human digital twin) or real.

The human digital twin concept, together with MHI and HPI, brings the various immediate benefits. For example, a human digital twin provides a single point of entry for machines and can substitute the real human for certain tasks, in cases that human is absent, tired, asleep, etc. A human digital twin can replace the real human for certain tedious and repetitive tasks. Moreover, the human digital twin can multi-task better than a real human. This allows the human to boost his productivity through his human digital twin. The human digital twin can also support the collaborative decision making process in the factory of the future. Many human errors can be avoided or corrected by the human digital twin. Additionally, in some embodiments, a human digital twin can operate the machines with its digital twin while supervising his digital twin. This may be useful in case of hazardous or dangerous environments.

Figure 6A:
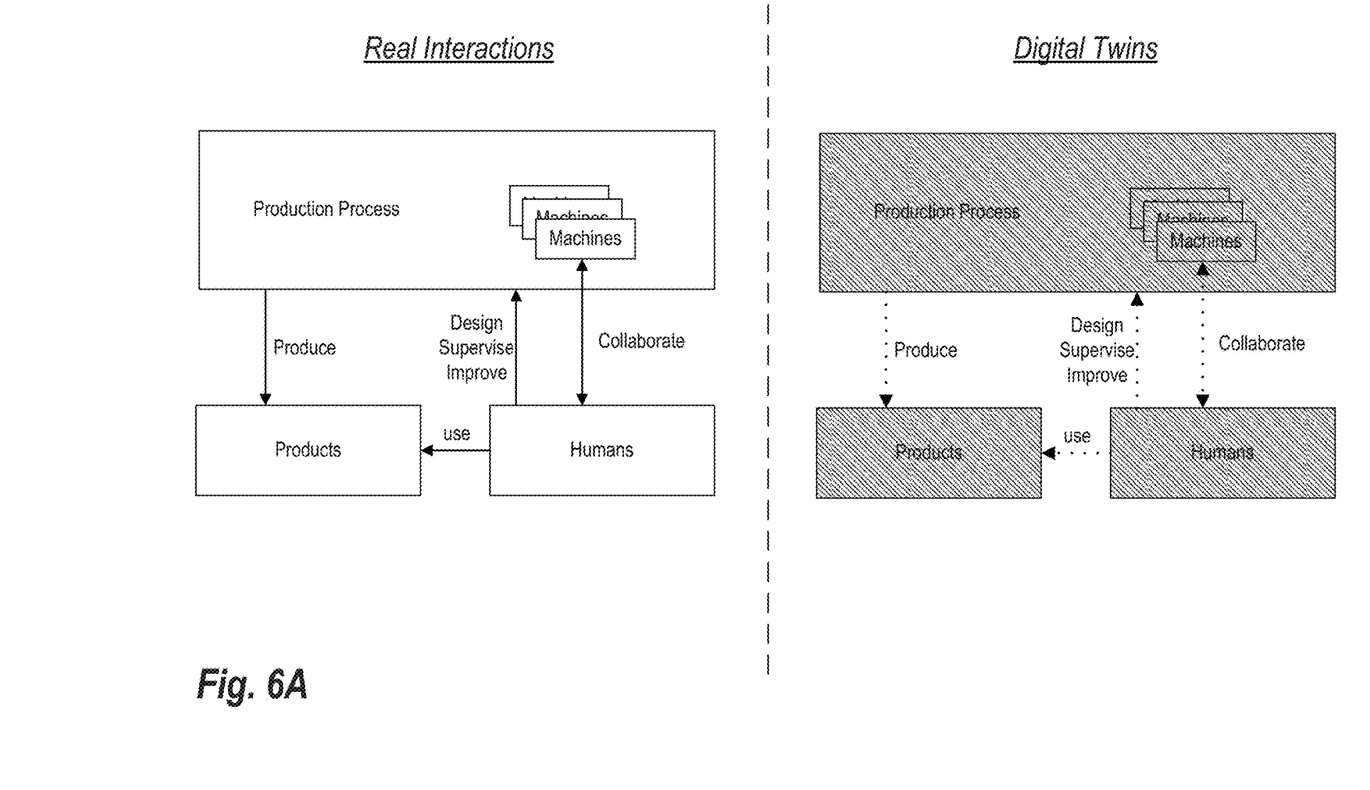
FIG. 6A shows how a factory operates with digital twins of production process, product and humans operating together, according to some embodiments.
Figure 6B:
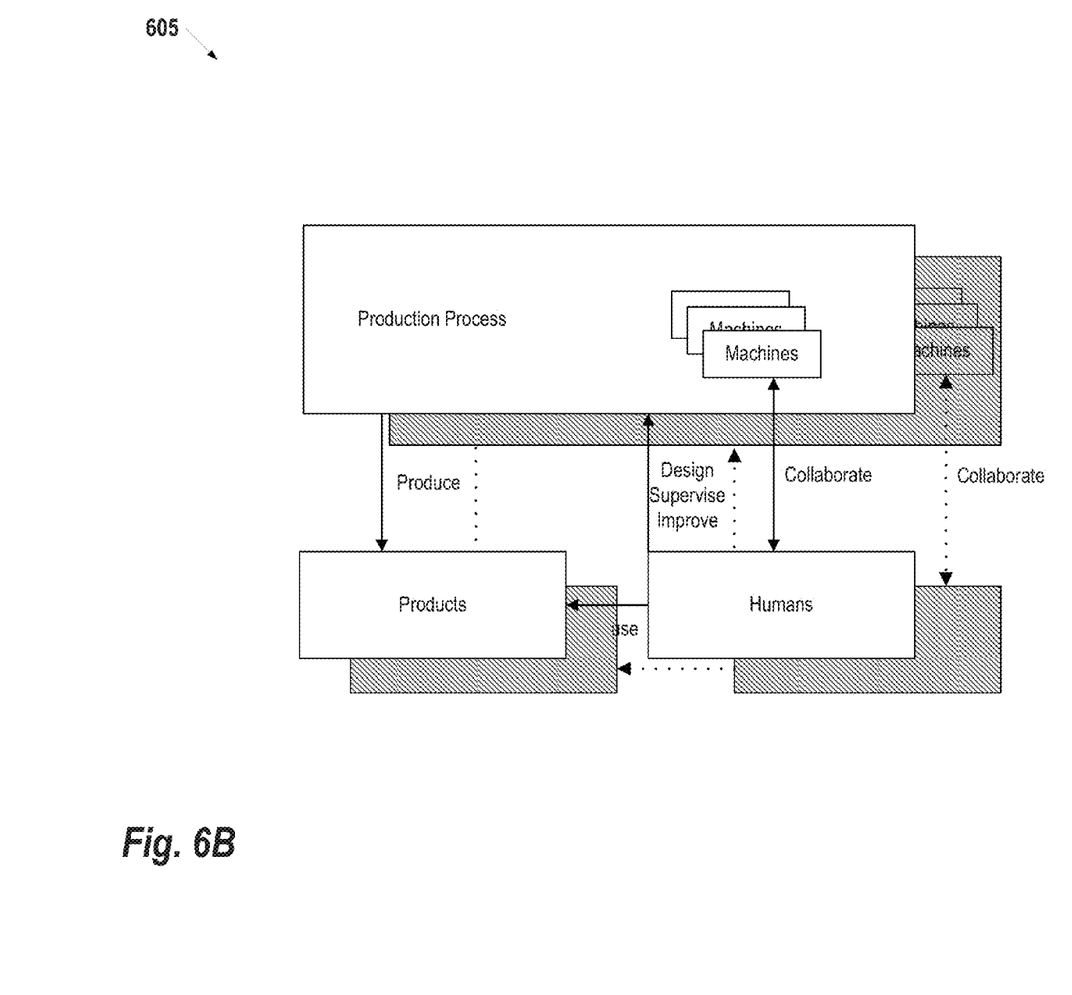
FIG. 6B shows how digital twins can be overlaid with real world counterparts.

FIG. 6A shows how a factory operates with digital twins of production process, product and humans operating together, according to some embodiments. The real interactions are mirrored digitally using these three digital twins (shown with cross-hatched shading). The digital twins thus create a parallel universe that the factory of the future can use to optimize its operation, safety, productivity, etc. The digital twins can be overlaid with the real world counterparts, as shown in FIG. 6B.

Humans can interact with their digital twins in a variety of ways. In some embodiments, real can instantiate/delete its digital twin instance(s). Although humans have a single instance, their human digital twins can be instantiated multiple times. A human can also assign tasks (responsibility of certain HPIs) to his digital twin instance(s) and supervise its digital twin to complete certain tasks. This assignment may be performed through any computing device available to the human. For example, in some embodiments, the human has a software application on his or her application that allows the human to interface with the digital twin. This interface may be, for example, via one or more computing devices in the factory environment hosting the MHI and its related components. Alternatively, HMI computers installed in the factory environment may be used for human-digital twin interactions.

In some embodiments, the human can train his or her digital twin instance(s) to react in various ways to different situations. In this way, the human digital twins can be personalized to their real human counterpart. For example, in some embodiments, the human provides explicit instructions for how to react to certain situations. In other embodiments, machine learning may be used to refine the digital twin automatically based on the human's behavior. For example, in some embodiments, the digital twin implements a reinforcement learning model. As is generally understood in the art, reinforcement learning models use software agents that try to maximize a reward that it receives from making decisions. For the digital twin, the software agent can use direct feedback from the corresponding human to establish positive and negative rewards. Additional feedback may also be gathered from other digital twins or from other factory systems. For example, actions that result in a safety incident can be used to establish a negative reward for the digital twin, while actions that result in increases in factory efficiency can be used to establish positive rewards.

In some embodiments, the factory's digital infrastructure is configured such that humans interact with one another via their digital twins. Thus, for example, requests that humans have one another pass through the same communication channels that machines use for interacting with humans. In this way, the MHI (and the factory system as a whole) can communicate with and manage humans in the same manner that the MHI communicates with and manages machines.

Figure 7:
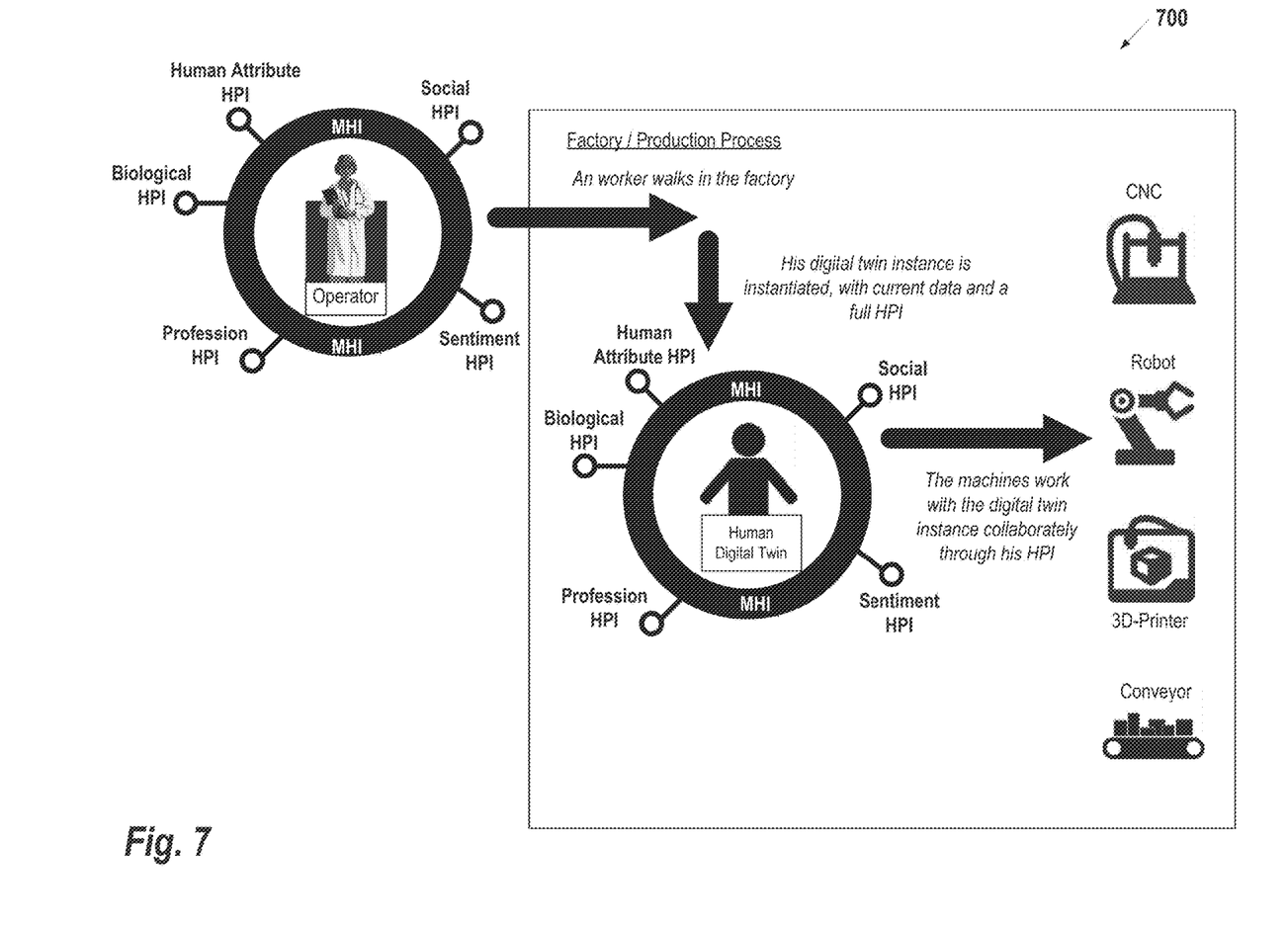
FIG. 7 provides a conceptual overview of a process for instantiating a human digital twin when a real worker walks into a factory, according to some embodiments.

FIG. 7 provides a conceptual overview of a process 700 for instantiating a human digital twin when a real worker walks into a factory, according to some embodiments. As the worker walks into the factory, the worker's presence is detected. This detection may be performed automatically, for example, using sensors in the factory or on the worker's person. Alternatively, the worker may manually register his or her presence in the factory (e.g., by entering an employee identifier into an HMI). Once the human is detected, an instance of the worker's digital twin is automatically instantiated with current data and a full HPI. The machines in the factory can then work with the digital twin instance collaboratively through the HPI.

Using the techniques described herein, a human can design, supervise, and improve a digital twin production process. But, the digital twin human can also design, supervise, and improve a digital twin or real production process. A human digital twin can exhaustively search thousands of design approaches in the design phase that a real human cannot. As a result, the human digital twin can predict the next steps during supervisory process, and can improve the process by simulation, etc. Moreover, a digital twin human collaborate with real machines or their digital twin counterparts. When digital twin humans collaborate with real machines, the digital twin humans participate in the real world production process and substitute or replace real humans. When digital twin humans collaborate with the digital twin machines, the digital twin humans are helping virtual commissioning, virtual production, and simulation to improve the production process.

In some embodiments, a digital twin human may include functionality for interacting with a real product or a digital twin product. This may be used in testing the product before the product is even produced. The human digital twins can thus provide feedback to the virtual or real product in terms of quality control, user experience, etc.

Various devices described herein including, without limitation, the MHIs and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

The aforementioned MHIs and related computing infrastructure may include one or more processors for implementing the techniques described herein. The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

In some embodiments portions of the MHI, HPI, and/or human digital twin are implemented using one or more executable applications. An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A system for interacting with human behavior in an automation environment, the system comprising:
   an automation system machine;
   one or more processors;
   a non-transitory, computer-readable storage medium in operable communication with the processors, wherein the computer-readable storage medium comprises one or more programming instructions that, when executed, cause the processors to:
   implement a human programming interface (HPI) comprising a data structure representative of a human, including properties and methods that digitally define ways in which the human may interact with the automation system machine;
   define an HPI for each of a plurality of human attributes relating to the human;
   store the HPIs in a machine human interface (MHI) configured to control the automation environment;
   select a human from a plurality of humans working in the automation environment;
   retrieve information related to the human from the HPIs;
   implement a digital twin of the selected human;
   update information relating to the selected human in the digital twin in real time; and
   interact, using the MHI via the digital twin, with the automation system machine such that one or more actions attributable to the selected human are performed on the automation system machine in real time based on the information related to the selected human.

2. The system of claim 1, wherein the instructions further cause the processors to:
   generate a message describing the one or more actions of the automation system based on a property or a method of at least one of the HPIs; and
   provide the message describing the one or more actions to the human.

3. The system of claim 2, wherein the message is provided by:
   using the HPI to identify a communication device associated with the human; and
   sending the message describing the one or more actions to the communication device using the HPI.

4. The system of claim 3, wherein the communication device is a smartphone and the message is sent to the human as a text message or email.

5. The system of claim 2, wherein the message is provided by:
   using the HPI to insert an event with the message into a calendar corresponding to the human.

6. The system of claim 1, where the human is selected from the plurality of humans working in the automation environment by:
   using one of the HPIs relating to a human attribute to retrieve calendar information corresponding to each of the plurality of humans; and
   using the calendar information to select the human based on the human's availability over a time period during which the one or more actions will be performed.

7. The system of claim 6, where the human is selected from the plurality of humans working in the automation environment by:
   using one of the HPIs relating to a human attribute to retrieve health-related information corresponding to each of the plurality of humans; and using one or more of the calendar information and the health-related information to select the human based on the human's availability over the time period during which the one or more actions will be performed.

8. The system of claim 6, where the human is selected from the
   plurality of humans working in the automation environment by:
   using one of the HPIs relating to a human attribute to retrieve skillset information corresponding to each of the plurality of humans; and
   using one or more of the calendar information and the skillset information to select the human based on the human's availability over the time period during which the one or more actions will be performed.

9. The system of claim 1, wherein the one or more actions require interaction by the human with the automation system machine and wherein the instructions further cause the processors to:
   use one or more of one of the HPIs relating to a human attribute to monitor the interaction by the human with the automation system machine while performing the one or more actions.

10. The system of claim 9, wherein the instructions further cause the processors to:
    during the interaction by the human with the automation system machine, retrieve biological information associated with the human using one of the HPIs relating to a human attribute;
    determine that the human is incapable of performing the one or more actions based on the biological information; and
    provide a notification to the human to stop performing the one or more actions.

11. The system of claim 1, wherein the HPIs relating to a human attribute is part of a digital twin associated with the human and the instructions cause the processors to perform at least a portion of the one or more actions using the digital twin associated with the human.

12. A system for interacting with humans in an automation environment, the system comprising:
    an automation system machine;
    one or more processors;
    a non-transitory, computer-readable storage medium in operable communication with the processors, wherein the computer-readable storage medium comprises one or more programming instructions that, when executed, cause the processors to:
    implement a data structure representative of an interface between the automation system machine and a human, including properties and methods that digitally provide ways in which the human may interact with the automation system machine, in the form of a human programming interface (HPI);
    define an HPI for each of a plurality of human attributes relating to the human;
    detect one or more workers present in the automation environment;
    for each of the one or more workers, instantiate a digital twin for the worker using a process comprising:
    generating the digital twin for the worker;

retrieving current data associated with the worker from the HPIs;

using the current data associated with the worker to update the digital twin; and providing access to the digital twin to external entities via the HPIs;

update data associated with the worker in real time; and interact, using the MHI via the digital twin, with the automation system machine such that one or more actions attributable to the human are performed on the automation system machine in real time based on the information related to the human.

13. The system of claim 12, wherein the instructions further cause the processors to:

receive a request for execution of a human action from a machine in the automation environment; and use the digital twin associated one of the workers to perform the human action.

14. The system of claim 13, wherein the request for execution of the human action is received via the HPIs associated with the digital twin.

15. The system of claim 12, wherein the instructions further cause the processors to:

use the digital twin associated with at least one of the workers to perform testing of at least one product.

16. The system of claim 15, wherein the product is a digital twin of a real product.

17. The system of claim 12, wherein the instructions further cause the processors to update the digital twin associated with a worker based on information manually input by the worker.

18. A method for using a human programming interface (HPI) to interact with humans in an automation environment, the method comprising:

providing, by a machine-human interface (MH) computer, a programming interface containing data structures including properties and methods relating to human attributes for accessing sensor data and service data corresponding to a plurality of humans working the automation environment;

instantiating a digital twin human for each of the plurality of humans working in the automation environment;

updating the data structures for each of the plurality of humans in real time based on current data associated with each human;

receiving, by the MHI computer, a function call from a machine via the programming interface for information associated with a human, wherein the function call comprises a request for retrieval of human information;

automatically generating, by the machine-human interface computer, a response to the function call comprising the human information;

transmitting, by the MHI computer, the response to the machine; and utilizing by the machine the human information and the digital twin human to perform one or more actions attributable to the human on the machine in real time.

19. The method of claim 18, further comprising:

automatically retrieving the human information from a sensor associated with the human in real time; and updating the data structure to represent the received human information.

20. The method of claim 18, further comprising:

automatically retrieving the human information from an external database over a computer network.

* * * * *